US012358775B2

(12) United States Patent
Zurita Ostos

(10) Patent No.: US 12,358,775 B2
(45) Date of Patent: Jul. 15, 2025

(54) MODULAR DISPENSING CONTAINER FOR OIL

(71) Applicant: Araceli Zurita Ostos, Seville (ES)

(72) Inventor: Araceli Zurita Ostos, Seville (ES)

( * ) Notice: Subject to any disclaimer, the term of this patent is extended or adjusted under 35 U.S.C. 154(b) by 81 days.

(21) Appl. No.: 18/270,075

(22) PCT Filed: Nov. 5, 2021

(86) PCT No.: PCT/ES2021/070795
§ 371 (c)(1),
(2) Date: Jun. 28, 2023

(87) PCT Pub. No.: WO2022/144474
PCT Pub. Date: Jul. 7, 2022

(65) Prior Publication Data

US 2024/0067515 A1 Feb. 29, 2024

(30) Foreign Application Priority Data

Dec. 28, 2020 (ES) ................................ U202032789

(51) Int. Cl.
*B67D 3/00* (2006.01)

(52) U.S. Cl.
CPC ......... *B67D 3/0077* (2013.01); *B67D 3/0009* (2013.01); *B67D 2210/00118* (2013.01)

(58) Field of Classification Search
CPC ............... F25D 2331/806; F25B 21/02; B67D 3/00–048
See application file for complete search history.

(56) References Cited

U.S. PATENT DOCUMENTS 135,617 A * 2/1873 Andrews ................... F25D 3/08 222/130
484,889 A * 10/1892 Collins ..................... F25D 3/06 222/130
2,134,865 A * 11/1938 Essery ..................... B67D 7/04 312/334.44
3,435,990 A * 4/1969 Pike, Jr. ............... B67D 3/0009 62/394
3,830,406 A * 8/1974 Robb ...................... F25D 23/12 222/51
4,143,795 A * 3/1979 Casebier .................. B67D 3/00 D7/308
4,341,328 A * 7/1982 Redick, Jr. ............... B67D 3/00 222/83.5

(Continued)

FOREIGN PATENT DOCUMENTS

EP 2735539 A1 5/2014
ES 1078329 U 12/2012

(Continued)

*Primary Examiner* — Paul R Durand
*Assistant Examiner* — Randall A Gruby
(74) *Attorney, Agent, or Firm* — Hayes Soloway PC

(57) ABSTRACT

The invention relates to a modular dispensing container for oil, consisting of a container designed to be installed as an independent module or as a group of several modules or different divisions or compartments, with internal layers of insulating material, and thermal glass with UV protection for the front face, and a lid located on the upper face, with a leak-tight seal, the oil or liquid being served via a dispensing tap located on the lower front part.

12 Claims, 3 Drawing Sheets

(56) References Cited

U.S. PATENT DOCUMENTS

| | | | | |
|---|---|---|---|---|
| 4,757,920 A | 7/1988 | Harootian et al. | | |
| 4,921,139 A * | 5/1990 | Fischer | B67D 1/0021 | 222/181.2 |
| 4,932,561 A * | 6/1990 | Boxall | B67D 1/0858 | 222/638 |
| 5,085,346 A * | 2/1992 | Wright | B67D 3/00 | 222/143 |
| 5,114,045 A * | 5/1992 | Herpe | B67D 7/66 | 222/105 |
| 5,603,432 A * | 2/1997 | Sardynski | B67D 1/0079 | 251/142 |
| 5,673,817 A | 10/1997 | Mullen et al. | | |
| 6,223,944 B1 | 5/2001 | Gehl et al. | | |
| 6,269,980 B1 * | 8/2001 | Randall | B67D 3/0029 | 222/481.5 |
| 6,293,434 B1 * | 9/2001 | Ellis | G07F 11/44 | 222/413 |
| 6,419,121 B1 * | 7/2002 | Gutierrez | B67D 1/0004 | 222/146.5 |
| 6,488,179 B1 * | 12/2002 | Vujicic | B67D 1/0431 | 222/325 |
| 6,871,015 B2 * | 3/2005 | Gutierrez | B67D 7/80 | 222/325 |
| 6,938,801 B1 * | 9/2005 | Reddy | B67D 1/108 | 222/529 |
| 7,320,416 B2 * | 1/2008 | Miller | B01F 33/84 | 222/476 |
| 8,485,396 B1 * | 7/2013 | Petrossian | B67D 7/02 | 222/465.1 |
| 8,690,016 B2 * | 4/2014 | Anderson | B67D 1/0857 | 222/105 |
| 8,844,768 B2 * | 9/2014 | Veltrop | B67D 3/0067 | 222/144.5 |
| 10,954,113 B2 * | 3/2021 | Sakai | F04B 43/1261 | |
| 2010/0133298 A1 | 6/2010 | Samson et al. | | |

FOREIGN PATENT DOCUMENTS

| | | |
|---|---|---|
| ES | 1137833 U | 3/2015 |
| ES | 2685143 A1 | 10/2018 |

* cited by examiner

MODULAR DISPENSING CONTAINER FOR OIL

CROSS-REFERENCE TO RELATED APPLICATIONS AND PRIORITY

This patent application claims priority from PCT Application No. PCT/ES2021/070795 filed Dec. 20, 2021, which claims priority from Spanish Patent Application No. U202032789 filed Dec. 28, 2020.

OBJECT OF THE INVENTION

The present invention refers to a novel modular oil thermo-container, preserver and dispenser, which, although intended primarily to contain extra virgin olive oils as an "oleoteca", is also capable of containing other liquids.

The benefits of olive oil are widely known, as well as being one of the pillars of the Mediterranean diet, but the truth is that it is still a simple olive juice, which is preserved thanks to its own antioxidants. That is why, in spite of having a long life, it is so important to preserve it in the right way if we do not want it to lose its properties or alter its flavor.

The container device object of the present invention comes to propose a solution to the problem of conserving, storing and adequately dosing different oils in homes, hotels, oil mills, "oleotecas", and other similar places, with a pleasant aesthetic, but at the same time functional, and technically conceived to preserve intact, especially in extra-virgin olive oil, both the chemical and nutritional properties that make it so healthy, as well as the organoleptic properties of flavor, aroma, nuances and color, thanks to the materials used for its construction and thermal control.

The container device can also be used for any other type of liquid susceptible to deterioration by light and temperature variations (wines, liquors, juices, etc.).

It is intended that this small modular appliance will become, if not indispensable, then very convenient and attractive for preserving oils in the same way as wines are preserved in wine coolers.

Among the advantages of this invention are the following:

A practical storage, which avoids having unsightly plastic bottles and carafes, taking up space in kitchens, cupboards and pantries, since the container proposed by this invention replaces these elements in the form of a modular appliance, and at sight. Built with one or several modules depending on the functional and aesthetic needs or the customer's taste.

The aesthetic novelty of the visualization of the different colors of the oils or liquids inside the container, not only to enjoy the aromas and nuances of extra-virgin olive oil, but also to enjoy the sense of sight with the different colors of the so-called green gold.

A special backlighting system that does not damage the content, and a front system of technical thermal glass against UV rays (ultraviolet).

The correct and precise dosage of the quantity of oil required at any given moment, by means of dispensers and taps technically designed for this purpose: for cooking, for dressing, for filling smaller bottles, for serving directly on toast.

Hygienic dosing conditions necessary in the home and catering, especially in situations where hygiene and health go hand in hand.

The industrial application of this invention is within the sector of household appliances and containers, vessels, recipients, tanks, and more specifically, modular oil dispensing containers.

ANTECEDENTS OF THE INVENTION

Although no invention identical to the one described has been found, we present below the documents found that reflect the state of the art related to it.

Thus, document ES1137833U refers to an oil tasting display characterized by consisting, basically, of 3 main elements: oil base, which has, a priori, a tubular geometry of square base and reduced height, with rounded edges according to the desired ergonomics, and optimized according to the morphology of the container to be exhibited and the comfort required for the oil tasting, is preferably made of transparent polypropylene, and is joined to the rear crumb collector by a hinge of the same material and less thickness, allowing the rotation between both parts; rear crumb catcher, which has, a priori, a flat geometry, with rounded edges according to the desired ergonomics, and optimized according to the morphology of the container to be exposed and the comfort required for the collection of the leftover bread. The bread basket is preferably made of transparent polypropylene, and is joined to the oil base by a hinge of the same material and lesser thickness, allowing the rotation between both parts, with a practicable flange for attachment to this base and fixing the folding position; and bread dividers, which have, a priori, an enveloping laminar geometry, in the form of flat ribs, with rounded edges according to the desired ergonomics, and optimized according to the morphology of the package to be displayed and the comfort required for the handling of the slices, preferably made of transparent polypropylene, constituted or as continuations of the crumb catcher back. Said utility model refers, therefore, to an oil tasting display, which requires its own container for the oil to be displayed, so that the oil container is not the display itself, as proposed in the main invention. Moreover, it has a totally different configuration, and lacks functions such as temperature control and protection and conservation against UV rays.

ES2685143A1 proposes a cup for tasting green olive oils characterized in that the cup has the following dimensions: —a total capacity of between 120 and 140 ml—a height between 55 mm and 65 mm—the diameter of the mouth between 45 to 55 mm—the diameter of the widest part of the cup between 65 and 75 mm—the diameter of the base of the cup between 30 to 40 mm. Therefore, said patent refers simply to a cup, and not to a dosing container, as proposed by the main invention.

ES1078329U describes a display container, which being intended to support at least one article, such as a container; it is characterized in that: —it comprises a support structure in combination with a light source, in whose active on position it projects its light onto at least the container contained within an interior space of the container support structure; —the interior space of the support structure communicates to the outside through at least one opening through which a luminosity comprising at least the combination of the light source and its projection onto the container is projected to the outside; —the support structure comprises a chamber housing at least the light source which is projected onto the container when it is turned on. Said display container of said utility model, like the first of the documents, refers to a display for supporting a container that will hold the oil or final product, so it does not solve the same problem posed by the main invention, and lacks functions that are the subject matter of the latter.

Conclusions: As can be seen from the research carried out, none of the documents found solves the problems posed as does the proposed invention.

DESCRIPTION OF THE INVENTION

The modular oil dispenser container object of the present invention is constituted from a container container arranged to be placed as an independent module, or as a grouping of several modules or different divisions or compartments, for different types of oils or other liquids.

In turn, they can be integrated into kitchens, like any other household appliance, or be independent for use on any surface or in any place.

The materials used for perfect preservation of the contents and their properties are mainly stainless steel for the overall housing, which may incorporate internal layers of insulating material, and thermal glass with anti-UV protection for the front face, from which the liquid can be visually appreciated.

The container module includes a lid located on the upper side that allows it to be filled, with a watertight seal that prevents contact with air, fumes and odors from the environment that could deteriorate the contents. This same opening allows the cleaning of the inside of the container.

In its more complex version, that is, with a temperature management and control system, the modular container has a refrigeration and control system based on a Peltier cell, evaporator refrigeration machine with compressor and condenser, or other type, independent for each modular compartment. A microcontroller with thermostat and means of control and monitoring allows to manage and regulate the temperature between 15 and 18 degrees Celsius.

Another electrical component that can be integrated into the module is a weight sensor that monitors the amount of oil remaining in the container, and in a different embodiment can also integrate an internal backlighting system with non-aggressive means of illumination, which does not alter the properties of the liquid to be preserved.

The power supply of the electrical components for different modular containers can be carried out by having connection pins on each module with respect to a joint back plate, which allows the power supply while the modules are inserted in it, but at the same time allowing their individual extraction with its corresponding handle; or, on the other hand, the set of modular containers can be inside the same refrigerated chamber, which cools all the modules globally, simplifying the circuitry.

The oil or liquid is dispensed by means of a dispenser tap, with a simple opening tap and/or, for greater precision, a manual or automatic lever dispenser.

This tap is located on the lower front part of the container and can be either fixed or retractable/extensible to facilitate dispensing further away from the cabinet or compartment where it is installed.

It is internally assisted by the weight pressure of the liquid on an internal base of the container oriented towards this point, and this surface or inclined plane can have different barriers and discontinuities to contain oil residues.

Likewise, each container module can have a single compartment, visible at all times from the thermal glass of the front face from which it will be possible to appreciate how the level of the same descends, or, in a different realization, each module has internally a small front compartment, which shows the contents thereof, thus offering a more aesthetic view, which keeps at all times in view the intense green of the product, being the other compartment, the main one, the one that is being used up for consumption.

The modular container object of the present invention can have fixed main dimensions, which are adjusted to the opening where it will be installed with a lid covering the perimeter openings, and can also be of customized dimensions for each opening or installation.

It can be considered as an individual appliance, or integrated in kitchen furniture as the modules are removable to be able to manipulate them.

BRIEF DESCRIPTION OF THE DRAWINGS

For a better understanding of the present description, drawings depicting a preferred embodiment of the present invention are provided herewith.

Figure 1:
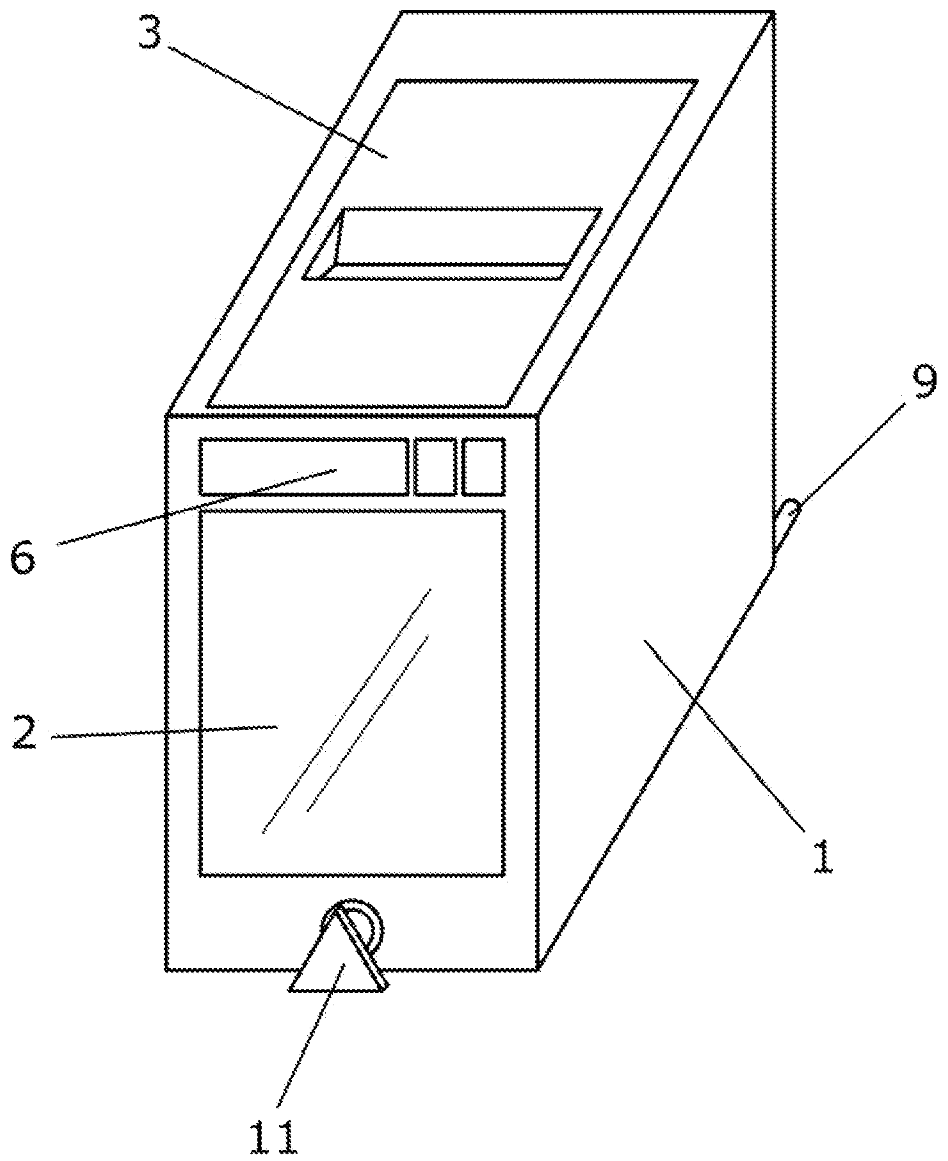
FIG. 1: Conventional perspective view of a modular oil dispensing container module object of the present invention.
Figure 2:
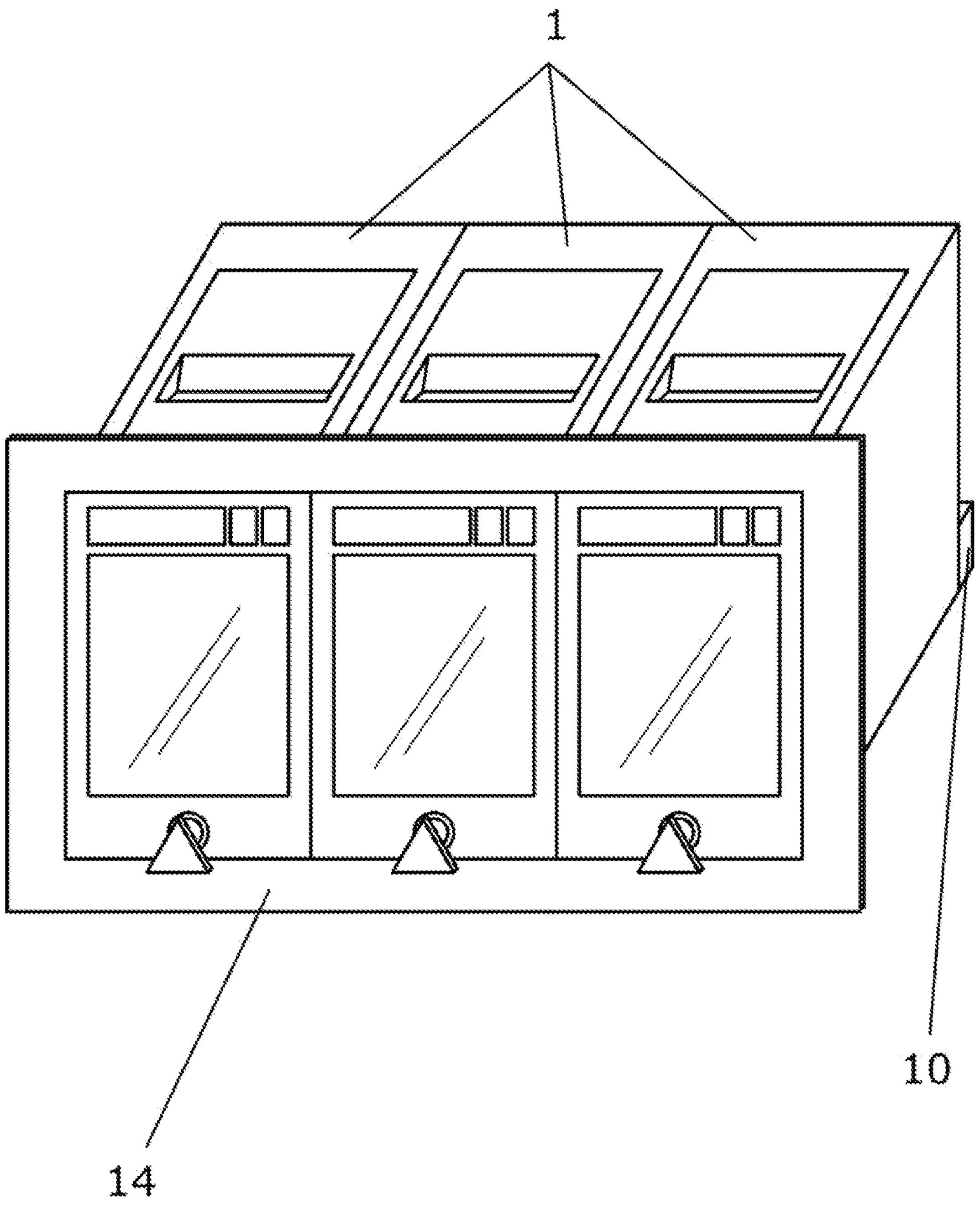
FIG. 2: Conventional perspective view of a three-module oil dispensing container module subject of the present invention.
Figure 3:
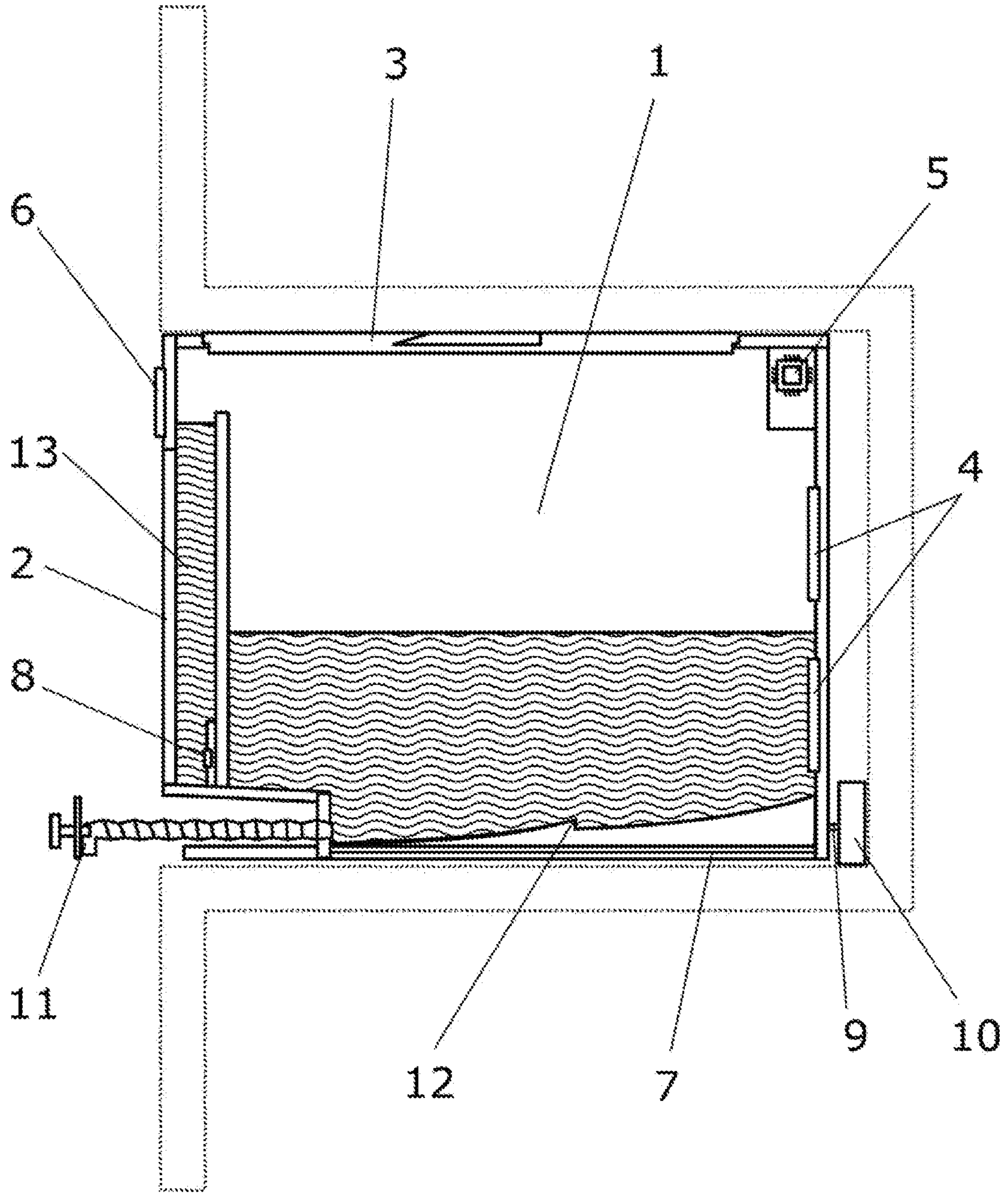
FIG. 3: Lateral elevation section of a model of a modular oil dispensing container object of the present invention, with retractable faucet.

The numerical references appearing in these figures correspond to the following constituent elements of the invention:

1. Module
2. Anti-UV thermal glass
3. Cover
4. Cooling and/or heating system
5. Microcontroller unit with thermostat
6. Control and monitoring means
7. Weight sensor
8. Lighting means
9. Connectors
10. Joint back plate
11. Dispenser tap
12. Barriers and discontinuities
13. Front compartment
14. Front cover

DESCRIPTION OF A PREFERRED EMBODIMENT

A preferred embodiment of the modular oil dispensing container of the present invention, with reference to the numerical references, can be based on a container container arranged to be placed as an independent module (1), or as a grouping of several modules, for different types of oils or other liquids.

The housing is made of stainless steel, with internal layers of insulating material, and thermal glass with anti-UV protection (2) for the front face, and includes a lid (3) located on the upper face, with a watertight seal.

Temperature management and control is carried out by a cooling and/or heating system (4) based on Peltier cells or an alternative independent solution for each modular compartment. A microcontroller unit with thermostat (5) and control and monitoring means (6) allow to manage and regulate this temperature.

Each module (1) also includes a weight sensor (7), and an internal backlighting system with non-aggressive lighting means (8).

The power supply of the electrical components for different modular containers is carried out by having connectors (9) on each module (1) with respect to a joint back plate (10), which allows the power supply while the modules are inserted in it, but at the same time allowing their individual removal with their corresponding handle.

In a different embodiment, the set of modular containers can be located inside the same chamber that maintains the appropriate temperature globally to all modules, simplifying the circuitry.

The oil or liquid is dispensed by means of a dispensing tap (11), with a simple opening tap and/or, for greater precision, a manual or automatic lever dispenser.

Said tap (11) is located on the lower front, or lower face of the module (1) and can either be fixed, or retractable/extensible for use when removed from the cabinet or compartment where it is installed.

The internal base of the container has a surface oriented towards the tap (11), and can have different barriers and discontinuities (12) to contain oil residues.

Likewise, each module (1) may have a single compartment, or, in a different embodiment, each module (1) has internally a small front compartment (13), with a sample of the liquid it contains, and which does not drop as it is used up, the other compartment, the main compartment, being the one containing the oil or liquid to be consumed.

The modular container object of the present invention can have fixed main dimensions, which are adjusted to the hole where it will be installed with a front cover (14) covering the perimeter holes, and can also be of customized dimensions for each hole or installation.

The invention claimed is:

1. A modular oil dispensing container comprising at least one module, wherein said at least one module comprises:

- a case formed by lateral, upper, lower, back, and front panels made of stainless steel combined with internal layers of insulating material which delimit a housing,
- a thermal glass with anti-UV protection located on the front panel,
- a lid fitted with a watertight seal located on the upper panel, which once opened allow the introduction of oil within the housing,
- a dispenser tap arranged at the bottom of the front panel from which the oil is poured;
- wherein the at least one module has a small independent front compartment within the housing in correspondence with the thermal glass which shows the oil.

2. The container of claim 1 wherein the at least one module comprises a cooling and/or heating system comprising Peltier cells, a microcontroller unit with thermostat and control and monitoring elements.

3. The container of claim 1 wherein the at least one module comprises a weight sensor.

4. The container of claim 1 wherein the at least one module comprises an internal backlighting system with non-aggressive lighting and a switch.

5. The container of claim 1 wherein the at least one module comprises a connector connectable to a power supply.

6. The container of claim 1 wherein the inner face of the lower panel has an inclined surface oriented towards the dispenser tap which has barriers and discontinuities to contain oil residues.

7. The container of claim 1 wherein the dispenser tap is retractable/extensible.

8. The container of claim 1 wherein the dispenser tap is of the manual lever type.

9. The container of claim 1 wherein it additionally comprises a container case and the at least one module consists of several modules located within said container case.

10. The container of claim 9 wherein the container case comprises a front cover.

11. The container of claim 9 wherein the container case comprises one refrigerated chamber which cools all the modules globally.

12. The container of claim 9 wherein it additionally comprises a joint back plate inside the container case, and each module is fitted with

- a connector that can be inserted into the joint back plate and removed individually and
- a handle.

* * * * *